(12) United States Patent
Liu et al.

(10) Patent No.: US 11,119,705 B2
(45) Date of Patent: Sep. 14, 2021

(54) METHOD, DEVICE, AND COMPUTER READABLE STORAGE MEDIUM FOR MANAGING REDUNDANT ARRAY OF INDEPENDENT DISKS

(71) Applicant: EMC IP Holding Company LLC, Hopkinton, MA (US)

(72) Inventors: Qingyun Liu, Beijing (CN); Jian Gao, Beijing (CN); Tianshu Sun, Beijing (CN); Sihang Xia, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/585,696

(22) Filed: Sep. 27, 2019

(65) Prior Publication Data

US 2020/0133587 A1 Apr. 30, 2020

(30) Foreign Application Priority Data

Oct. 26, 2018 (CN) .......................... 201811260768.7

(51) Int. Cl.
*G06F 3/06* (2006.01)
(52) U.S. Cl.
CPC .......... *G06F 3/0689* (2013.01); *G06F 3/0604* (2013.01); *G06F 3/0631* (2013.01)

(58) Field of Classification Search
CPC ..... G06F 3/0689; G06F 3/0604; G06F 3/0631
See application file for complete search history.

(56) References Cited

U.S. PATENT DOCUMENTS

| | | | |
|---|---|---|---|
| 7,000,237 B1 * | 2/2006 | Sinha | G06F 9/542 719/318 |
| 10,334,468 B2 | 6/2019 | Salot et al. | |
| 10,430,279 B1 * | 10/2019 | Dittia | G06F 3/0688 |
| 10,756,979 B2 | 8/2020 | Peng et al. | |
| 10,782,997 B1 | 9/2020 | Krishna Murthy et al. | |
| 2009/0287880 A1 * | 11/2009 | Wright | G06F 11/2069 711/114 |
| 2016/0210057 A1 * | 7/2016 | Khande | G06F 3/0632 |
| 2017/0220282 A1 * | 8/2017 | Dambal | G06F 3/0604 |

* cited by examiner

*Primary Examiner* — Edward J Dudek, Jr.
(74) *Attorney, Agent, or Firm* — BainwoodHuang (57) ABSTRACT

Techniques manage a redundant array of independent disks. In such a technique, an instruction to expand the RAID is received, the RAID being formed by a first group of storage devices and including a first group of RAID extents. A second group of RAID extents created on a second group of storage devices and logical units are created on the second group of RAID extents. In response to receiving an indication for a failure of the creation of the second group of RAID extents or the logical units, a notification is generated for indicating a failure of the expansion of the RAID without triggering a shuffling operation, the shuffling operation causing storage extents in the first and second groups of RAID extents to be distributed in the first and second groups of storage devices.

10 Claims, 7 Drawing Sheets

METHOD, DEVICE, AND COMPUTER READABLE STORAGE MEDIUM FOR MANAGING REDUNDANT ARRAY OF INDEPENDENT DISKS

CROSS-REFERENCE TO RELATED APPLICATION

This application claims priority to Chinese Patent Application No. CN201811260768.7, on file at the China National Intellectual Property Administration (CNIPA), having a filing date of Oct. 26, 2018, and having "METHOD, DEVICE, AND COMPUTER READABLE STORAGE MEDIUM FOR MANAGING REDUNDANT ARRAY OF INDEPENDENT DISKS" as a title, the contents and teachings of which are herein incorporated by reference in their entirety.

FIELD

Embodiments of the present disclosure relate to storage systems, and more specifically to a method, device, and computer readable storage medium for managing a redundant array of independent disks (RAID).

BACKGROUND

RAID is a data storage virtualization technology, and it combines multiple physical storage devices into one or more logical units for purposes such as data redundancy and performance improvement. During the use of RAID, there may be cases where the capacity is too small. In this case, it is necessary to expand the RAID storage pool. Expansion of the storage pool might fail for a variety of reasons. When the expansion of the storage pool fails, the storage pool experiences a rollback process. Expanded disks (new disks) will be shrunk one by one until all the expanded disks are shrunk.

Since some disk extents may have already been shuffled to the new expanded disks, these disk extents must be shuffled back during the shrink process. It might take a long time period, for example, many days, to shuffle back all these expanded disks. During the time period, input/output (I/O) performance will be greatly affected. Therefore, it is necessary to provide a technical solution that at least partially solves the above technical problems.

SUMMARY

Embodiments of the present disclosure provide a method, device, and computer program product for managing a RAID.

According to a first aspect of the present disclosure, there is provided a method for managing a RAID. The method includes: receiving an instruction to expand the RAID, the RAID being formed by a first group of storage devices and including a first group of RAID extents; creating a second group of RAID extents on a second group of storage devices and logical units on the second group of RAID extents; and in response to receiving an indication for a failure of the creation of the second group of RAID extents or the logical units, generating a notification for indicating a failure of the expansion of the RAID without triggering a shuffling operation, the shuffling operation causing storage extents in the first and second groups of RAID extents to be distributed in the first and second groups of storage devices.

According to a second aspect of the present disclosure, there is provided a device for managing a redundant array of independent disks (RAID), including: a processing unit; a memory coupled to the processing unit and including instructions stored thereon, the instructions, when executed by the processing unit, causing the device to perform acts including: receiving an instruction to expand the RAID, the RAID being formed by a first group of storage devices and including a first group of RAID extents; creating a second group of RAID extents on a second group of storage devices and logical units on the second group of RAID extents; and in response to receiving an indication for a failure of the creation of the second group of RAID extents or the logical units, generating a notification for indicating a failure of the expansion of the RAID without triggering a shuffling operation, the shuffling operation causing storage extents in the first and second groups of RAID extents to be distributed in the first and second groups of storage devices.

According to a third aspect of the present disclosure, there is provided a computer-readable storage medium including machine-executable instructions stored thereon which, when executed by at least one processor, cause the at least one processor to perform the method according to the first aspect.

According to a fourth aspect of the present disclosure, there is provided a computer program product stored on a computer-readable medium and including machine-executable instructions which, when executed, cause a machine to perform the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference signs refer to the same elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described as follows in greater detail with reference to the drawings. Although preferred embodiments of the present disclosure are illustrated in the drawings, it is to be understood that the present disclosure described herein can be implemented in various manners, not limited to the embodiments illustrated herein. Rather, these embodiments are provided to make the present disclosure described herein clearer and more complete and convey the scope of the present disclosure described herein completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." Terms "a first", "a second" and others can denote different or identical objects. The following text may also contain other explicit or implicit definitions.

Figure 1:
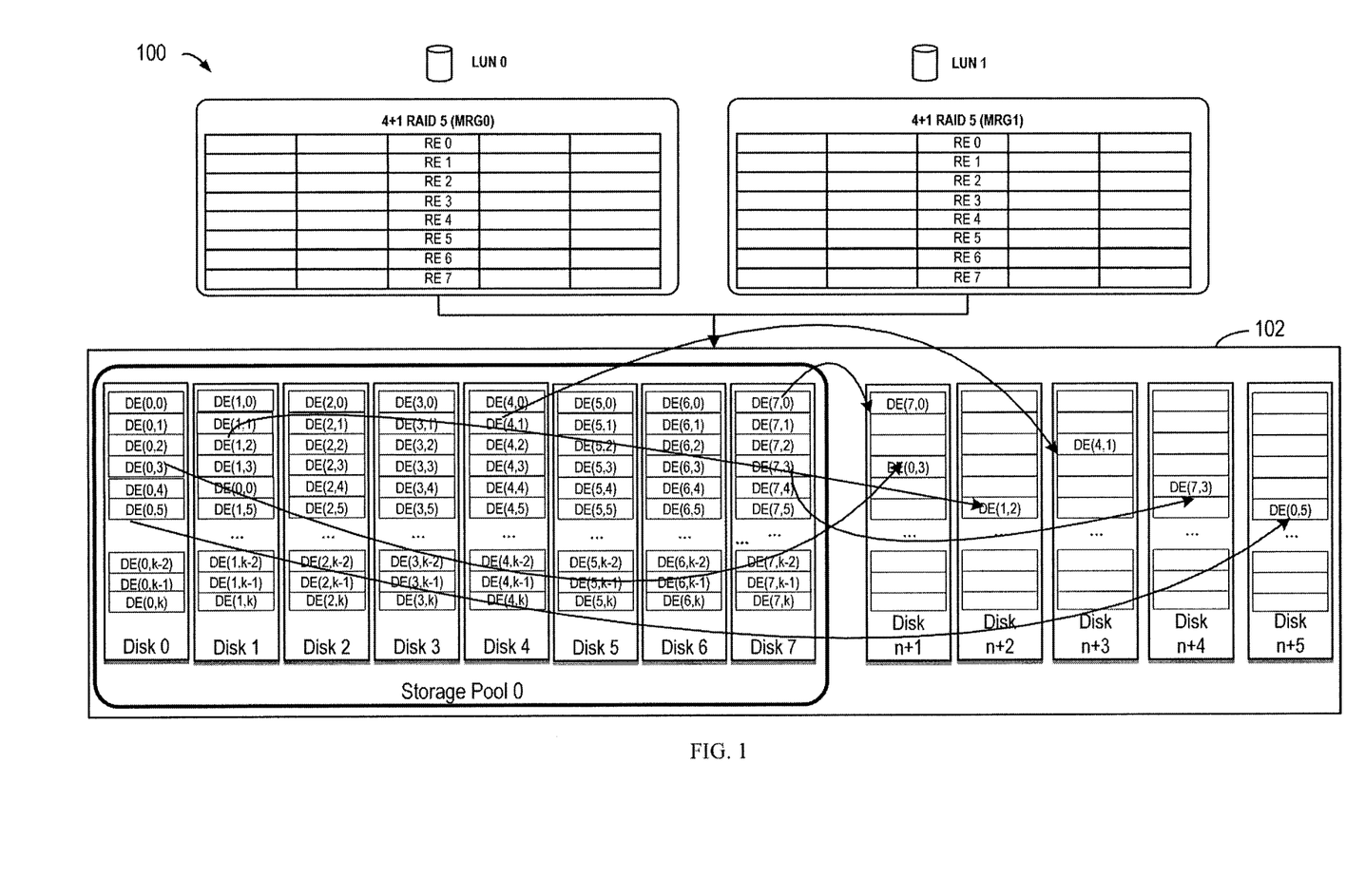
FIG. 1 is a schematic diagram illustrating expansion of a mapped RAID in accordance with some embodiments of the present disclosure.

FIG. 1 is a schematic diagram illustrating an expansion process 100 of a mapped RAID in accordance with some embodiments of the present disclosure. A mapped RAID is a RAID created on a storage pool, rather than a RAID created on several specific storage devices (for example, drives, hard disks or solid-state drives SSDs). In the mapped RAID, a storage device or disk in a storage pool is divided into a series of fixed sized, non-overlapping segments. These segments may be referred to as storage extents or disk extents (DEs).

The logical space of the mapped RAID is split into to a bunch of continuous, non-overlapping segments. These segments may be referred to as a RAID Extent (RE). Each RE consists of multiple DEs which are selected from different storage devices or disks according to a RAID policy. For example, if the mapped RAID is a 4D+1P RAID 5, the number of DEs in each RE is 5. Each RAID extent may be considered as a traditional RAID.

To record each RAID extent in the mapped RAID, a RAID mapping table (RMT) may be maintained. In addition, a storage extent pool, also referred to as a storage pool, an extent pool, or a disk extent pool (DE pool), refers to a group of storage devices or a group of disks. The storage pool is created by the user, and a group of disks can be expanded and shrunk, which may manage the state of all DEs, for example, whether they are consumed or the like.

As shown in FIG. 1, the storage pool 0 includes eight disks, and each disk includes a plurality of DEs. Eight RAID extents are created on the eight disks, RE 0-RE 7, which form a mapped RAID group MRG0, such as 4+1 RAID 5. A logical unit, such as LUN0, may be created on MRG0, as shown in FIG. 1.

The storage pool expansion may be divided into two categories, small expansion and large expansion. If the number of the new disks is below a specified count (e.g., RAID width+1), the expansion is a small expansion; otherwise, the expansion is a large expansion. Embodiments of the present disclosure may solve the problem of consuming a great amount of rollback time when the large expansion fails, wherein a mapped RAID may be directly created on the new disks.

In the expansion process 100, disks n+1, n+2, n+3, n+4, n+5 are added. On the newly-added disks n+1 to n+5, a mapped RAID group MRG1 may be created, and a logical unit LUN1 is created on the mapped RAID group MRG1. After the RAID group MRG1 and the logical unit LUN1 are successfully created, a shuffle operation is started, so that the mapped RAID extents are evenly distributed on all the disks in the expanded storage pool 102. This means that some disk extents of MRG0 will be shuffled to 5 new disks, and some disk extents of MRG1 will be shuffled to the original 8 disks. As shown in FIG. 1, the disk extent DE(0,3) will be moved to disk n+1, the disk extent DE(0,5) will be moved to disk n+5, and so on.

Normally, the storage pool expansion will be successful. However, there is still some possibility for the storage pool expansion to fail. For example, a mapped RAID is created successfully, but the new mapped RAID can't be ready in the given time limit. Hence, the storage pool expansion fails. For this reason or other reasons, when the storage pool expansion fails, the storage pool will undergo a rollback process. All expanded disks will be shrunk one by one until all expanded disks are shrunk.

Since some disk extents (DEs) might have been shuffled to a new expanded disk, these DEs must be shuffled back during the shrinking process. It might take a long time period, for example, many days, to shuffle back all these expanded disks. During the time period, input/output (I/O) performance will be greatly affected.

Therefore, it is desirable to reduce the time consumed by the shrinking process so that the user may quickly retry the next round of expansion operations and obtain the required capacity more quickly. In addition, it is desirable to reduce the impact on I/O performance during the rollback process.

Figure 2:
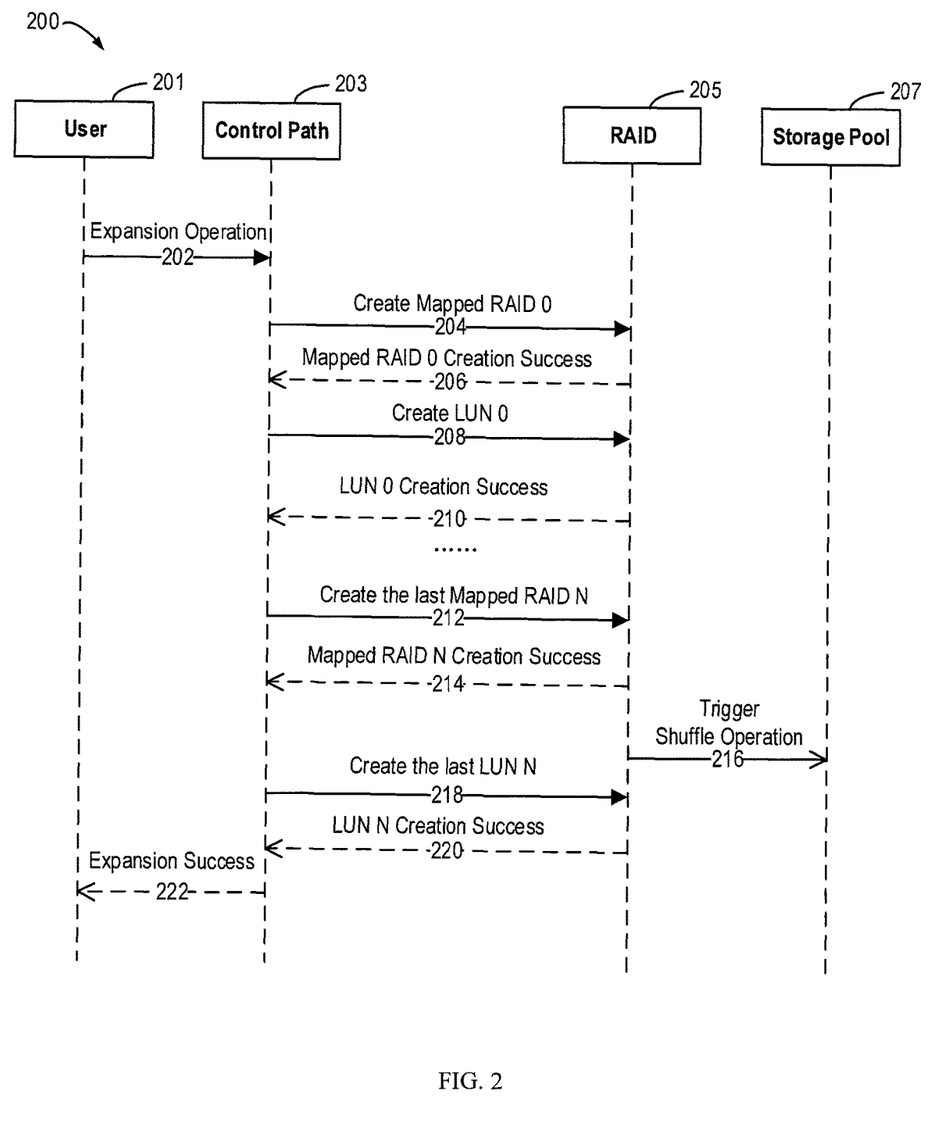
FIG. 2 illustrates a flow chart of a method for expanding a mapped RAID according to the prior art.

FIG. 2 shows a flow chart of a method 200 for expanding a mapped RAID in accordance with the prior art. As shown in FIG. 2, a user 201 initiates a storage pool expansion operation at 202, and sends a control path 203 an instruction to expand a storage pool or RAID. This instruction may contain information about the new disk and the RAID and LUNs to be created. The control path is responsible for sending an instruction to the RAID 205 (e.g., multi-core RAID MCR) to create or delete the mapped RAID and LUN. The RAID 205 will return a job status to the control path 203 and initiate a shuffling operation.

As shown in FIG. 2, after receiving the instruction, the control path 203 sends at 204 an instruction to the RAID 205 to create a mapped RAID 0 or RAID extent RE 0. The RAID 205 creates RE 0 on the new disk, and after successful creation of RE 0, may return at 206 the control path 203 a response indicative of successful creation of RE 0. Alternatively, the RAID 205 may not send the response indicative of successful creation of RE. The control path 203 sends at 208 an instruction to the RAID 205 to create a LUN 0. The RAID 205 creates the LUN0 on RE 0, and after successful creation of the LUN 0, may send at 210 a response indicative of successful creation of the LUN0 to the control path 203. In this way, the control path 203 instructs at 212 the RAID 205 to create the last RE N. After successfully creating the RE N, the RAID 205 sends at 214 a response indicative of successful creation of RE N to the control path 203. The RAID 205 at 216 triggers a shuffling operation to the storage pool 207. After the shuffling operation is triggered, the shuffling operation can be performed in the background. The control path 203 may instruct at 218 the RAID 205 to create the last LUN N, and RAID 205 may return at 220 a response indicative of successful creation of the LUN N. The control path 203 may provide at 222 a response indicative of successful expansion of the storage pool to the user 201.

In this way, the expanded storage pool may provide services to the user without having to wait for the shuffling operation to complete, thereby having an expanded capacity. The shuffling operation can be performed as a background service to move the disk extents in the storage pool.

Figure 3:
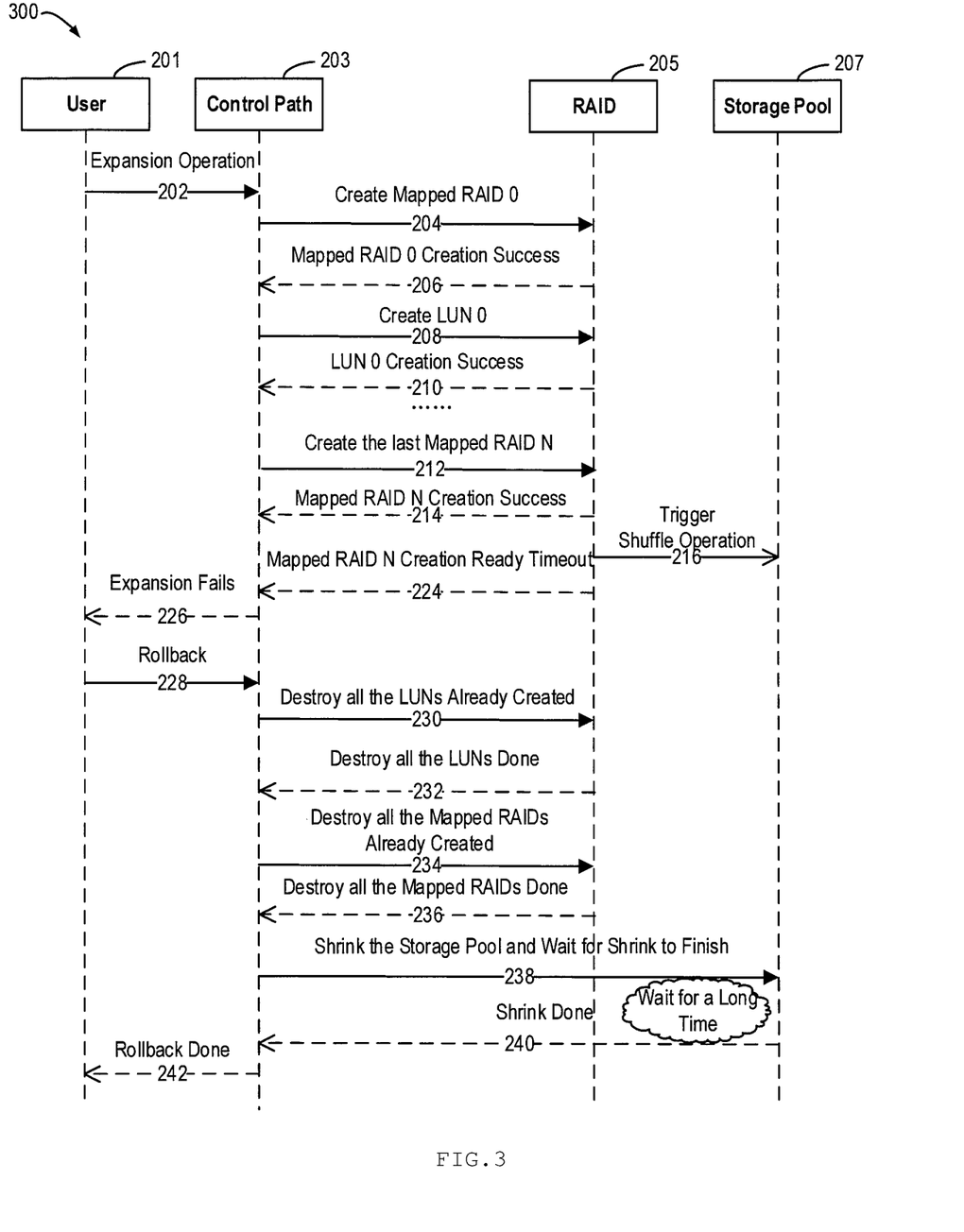
FIG. 3 illustrates a flow chart of a method for shrinking a mapped RAID according to the prior art.

FIG. 3 illustrates a flow chart of a method 300 of performing a rollback operation when the expansion of the mapped RAID fails, in accordance with the prior art. The method 300 has many similarities to the method 200, and the same reference signs are used herein to denote the same operations and no detailed description is provided herein.

After a mapped RAID is created successfully, some initialization operations need to be performed internally, and it will be ready for the user's operation after the initialization operations are completed. For example, the control path may require the mapped RAID to become ready within a predetermined time (e.g., 2 minutes). However, if the mapped RAID is only created successfully, but does not become ready within the predetermined time, the RAID 205 will return a response of timeout to the control path 203.

As shown in FIG. 3, at 224, the RAID 205 returns the control path 203 a response indicative of timeout of completion of creation of the RE N. In this case, the control path 203 may provide at 226 the user 201 with a response indicative of failed expansion. The user 201 may instruct at 228 the control path 203 to roll back. The control path 203 instructs at 230 the RAID 205 to destroy or delete all created LUNs. After destroying or deleting all already-created LUNs, the RAID 205 provides at 232 the control path 203 with a response indicative of completion of destroy or deletion of all LUNs. The control path 203 instructs at 234 the RAID 205 to destroy or delete all already-created mapped RAIDs. After destroying or deleting all of the already-created mapped RAIDs or REs, the RAID 205 provides at 236 the control path 203 with a response indicative of completion of deletion of all mapped RAIDs. The control path 203 sends at 238 the storage pool 207 a shrinking task to shrink the storage pool 207 and wait for the shrinking to complete. After the storage pool 207 receives the shrinking task, the storage pool 207 will stop the shuffling operation and begin the shrinking operation. The shrinking task copies all occupied disk extents on the expanded disk to the original disk before the expansion. In this way, the copying and shrinking operations are performed for all expanded disks one by one. This shrinking process usually consumes a lot of time. After the shrinking is completed, the storage pool 207 will provide at 240 the control path 203 with an indication that the shrinking is completed. At 242, the control path 203 provides the user 201 with a response indicative of the completion of the rollback.

As the shuffling task may have been going on for a long time before the shrinking task. Therefore, the shrinking might take a long time to complete, such as many days. During this time, I/O performance will be severely affected.

Figure 4:
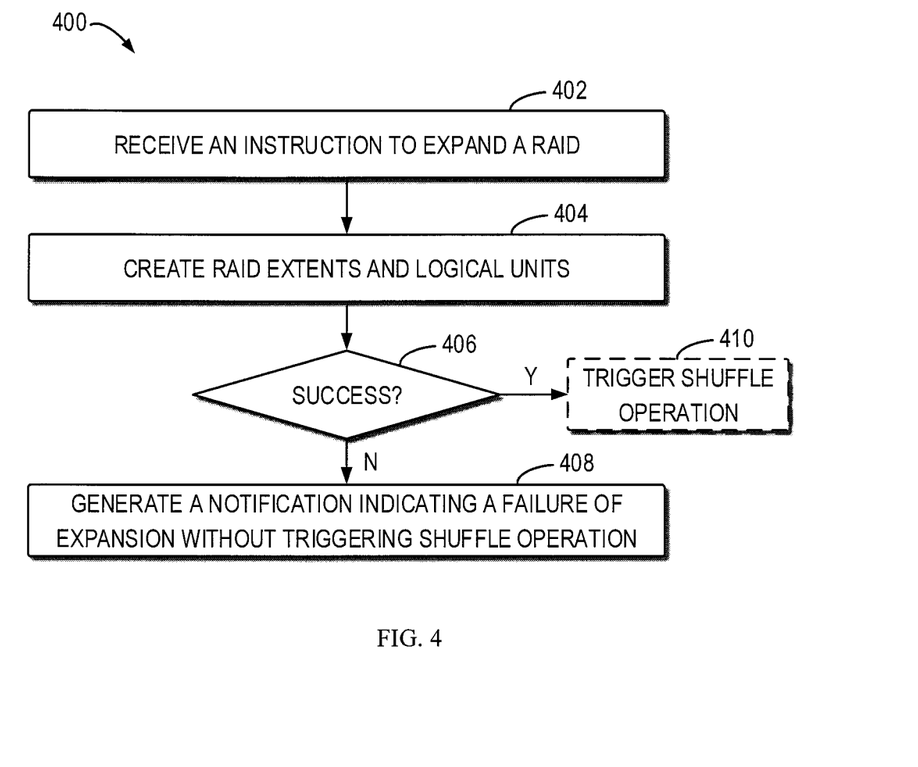
FIG. 4 illustrates a flow chart of a method for managing a RAID according to some embodiments of the present disclosure.

In order to solve the above problems, embodiments of the present disclosure provide a solution for managing the RAID. FIG. 4 illustrates a flow chart of a method 400 for managing the RAID, in accordance with some embodiments of the present disclosure. The method 400 may be performed at the control path 203.

At block 402, the control path 203 receives an instruction to expand the RAID. For example, the instruction may be received from the user 201. The RAID may be a storage pool 0 as shown in FIG. 1 and formed by a first group of storage devices, for example disks 0-8 shown in FIG. 1. The RAID may include a first group of RAID extents, for example, RAID extents RE 0-RE 7 in MRG0 as shown in FIG. 1.

At block 404, the control path 203 creates a second group of RAID extents on a second group of storage devices and logical units on the second group of RAID extents. For example, the second group of storage devices may be disk n+1 to disk n+5 as shown in FIG. 1, and the second group of RAID extents may be RAID extents RE 0-RE 7 in MRG1 as shown in FIG. 1. The logical units thereon are represented by LUN1.

At block 406, the control path 203 determines if the second group of RAID extents and the logical units on the second group of RAID extents are successfully created. If the control path 203, for example at 406, receives from the RAID 205 an indication that it fails to create the second group of RAID extents or the logic units, the control path 203 generates at block 408 a notification indicating that the expansion of the RAID failed without triggering a shuffling operation. The shuffling operation distributes the storage extents (or disk extents DEs) in the first and second groups of RAID extents in the first and second groups of storage devices. It should be understood that failure to create the second group of RAID extents or the logical units includes the case of timeout in getting ready when creating the RAID extent or mapped RAID.

In some embodiments, the control path 203 may receive a rollback instruction from the user 201. If the rollback instruction is received from the user 201, the control path 203 deletes the logical unit that has been created on the second group of storage devices and the RAID extent that has been created on the second group of storage devices. In some embodiments, after receiving from RAID 205 a notification that the created logical unit and RAID extent are deleted, the control path 203 sends the user 201 a notification indicating that the rollback is completed.

In some embodiments, as shown in FIG. 4, if it is determined at block 406 that the second group of RAID extents or the logical units described above are successfully created, the control path 203 triggers the shuffling operation to the RAID or storage pool at block 410.

According to an embodiment of the present disclosure, the control path may be used as an initiator of a shuffling operation to determine when to trigger the shuffling operation. Since the control path knows best whether the storage pool expansion succeeds or fails, the shuffling is not triggered immediately after the last mapped RAID is created successfully, but the shuffling operation is delayed after more handshake operations. For example, the shuffling operation is triggered only after the control path has received, from the RAID, a response that all RAID extents and LUNs are created successfully. If the control path receives any errors from the RAID, the control path will not trigger the shuffling operation so that the subsequent shrinking operations are not required to be performed.

Figure 5:
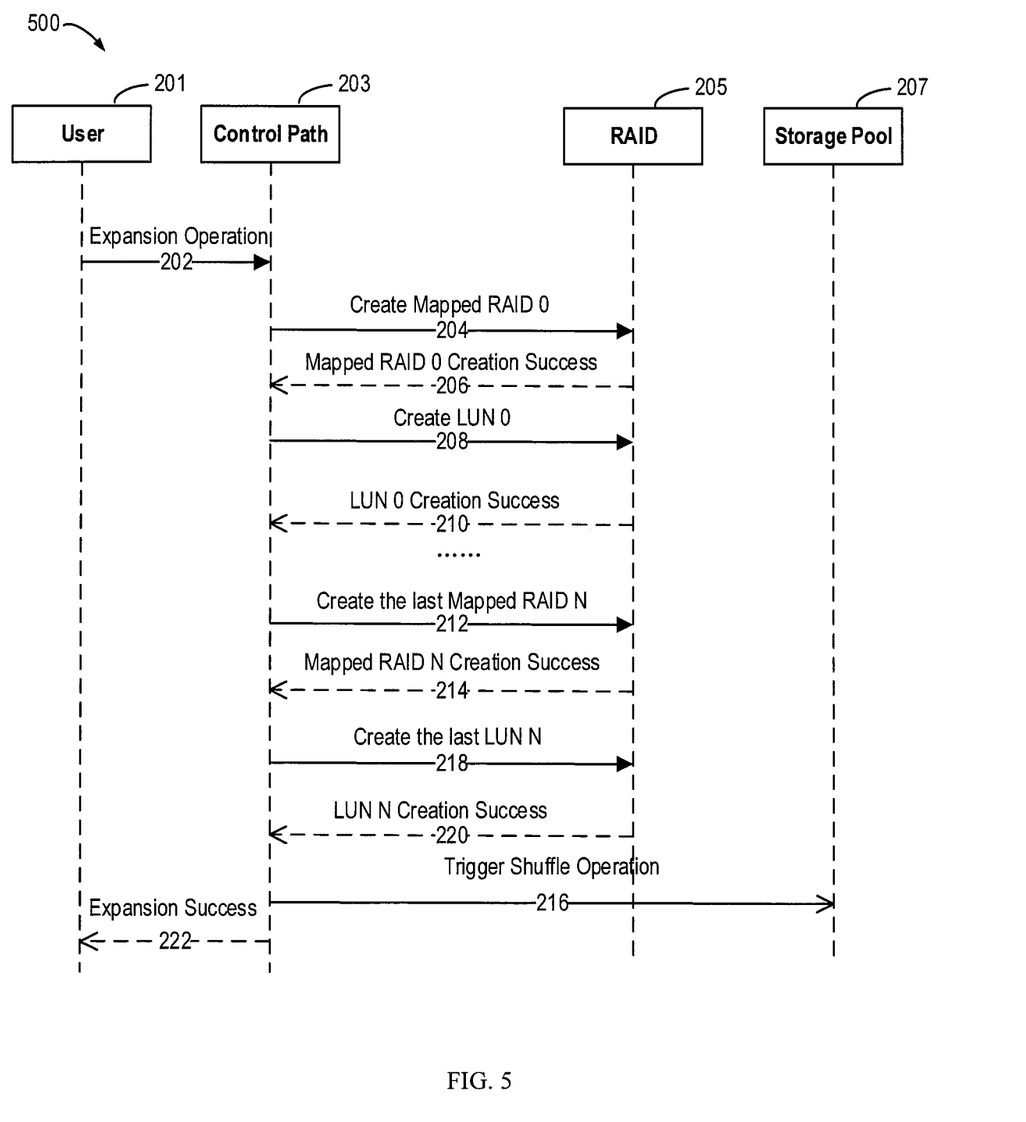
FIG. 5 illustrates a flow chart of a method for expanding a mapped RAID according to some embodiments of the present disclosure.

FIG. 5 illustrates a flow chart of a method 500 for expanding a mapped RAID according to some embodiments of the present disclosure. The method 500 has many similarities to the method 200, and the same reference signs are used herein to represent the same operations, and no detailed description is presented herein.

The method 500 differs from method 200 in that the control path 203 triggers the shuffling operation instead of the RAID 205, and control path 203 triggers the shuffling operation after determining that all mapped RAIDs and all LUNs have been successfully created. For example, the control path 203 triggers the shuffling operation after receiving from the RAID 205 a response that all mapped RAIDs and all LUNs have been successfully created.

Figure 6:
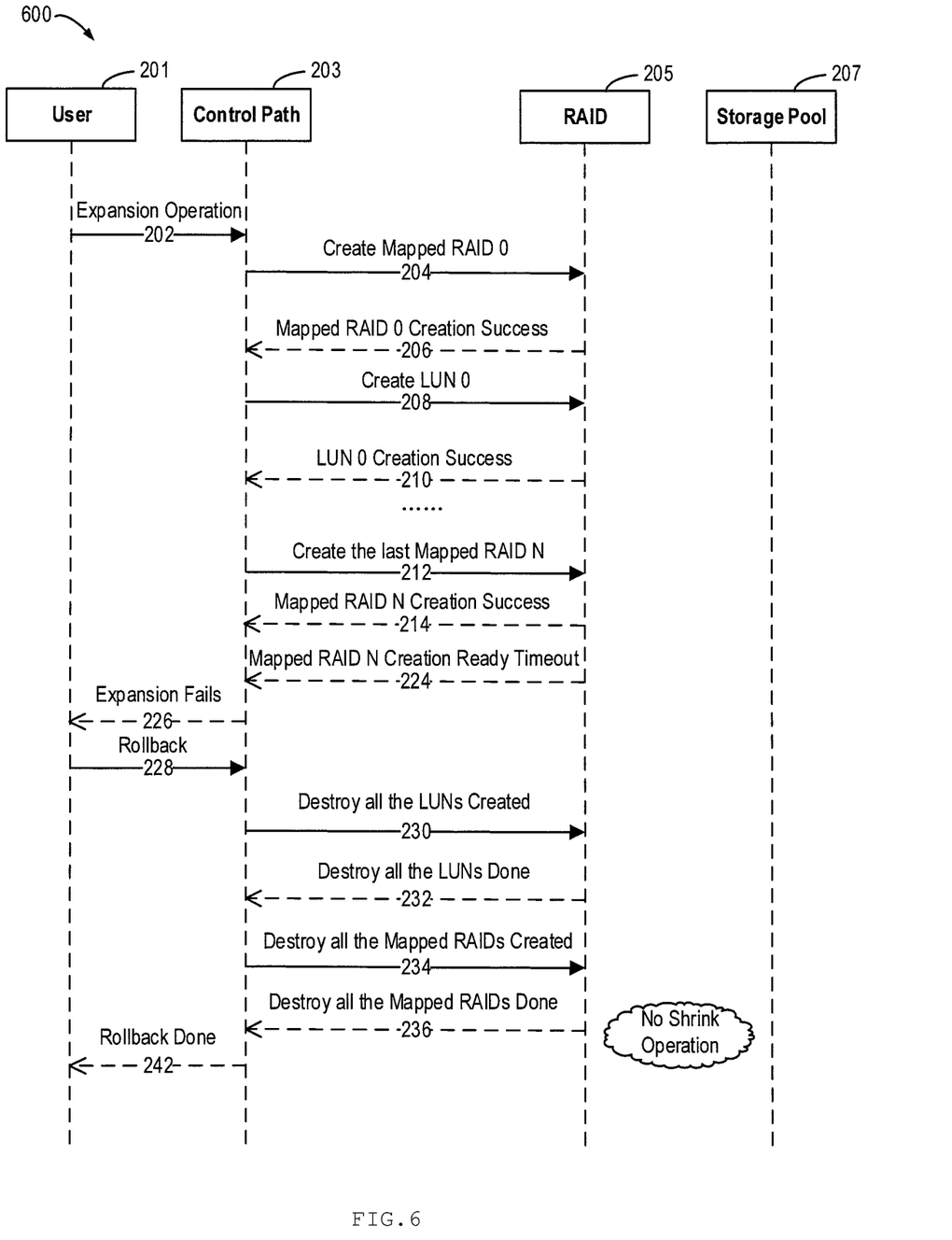
FIG. 6 shows a flow chart of a method for shrinking a mapped RAID according to some embodiments of the present disclosure.

FIG. 6 illustrates a flow chart of a method 600 of performing rollback when the expansion of the mapped RAID fails according to some embodiments of the present disclosure. The method 500 has many similarities to the method 300, and the same reference signs are used herein to represents the same operations, and no detailed description is presented herein.

The control path 20 triggers the shuffling operation instead of the RAID 205, and the control path 203 may not trigger the shuffling operation after receiving an error message. If creation of any mapped RAID or LUN fails, the RAID 205 will send a related error code to the control path 203. The RAID 205 is not responsible for triggering the shuffling operation. Instead, the control path receives an error code from the RAID 205 and decides whether to trigger the shuffling operation.

For example, as shown in FIG. 6, after the RAID N is successfully created at 214, the RAID 205 does not get ready within a predetermined time period. The RAID 205 sends at 224 a response indicative of timeout of getting ready to the control path 203. Upon receiving the response indicative of timeout for being ready of RAID N, the control path 203 provides at 226 the user 201 with a response that the storage pool expansion fails. Since the shuffling operation is not performed, the method 600 does not require a shrinking operation during the rollback process, thereby having no substantial impact on the I/O and saving a lot of time. After the rollback is completed quickly, the user may retry the next expansion operation as soon as possible.

Figure 7:
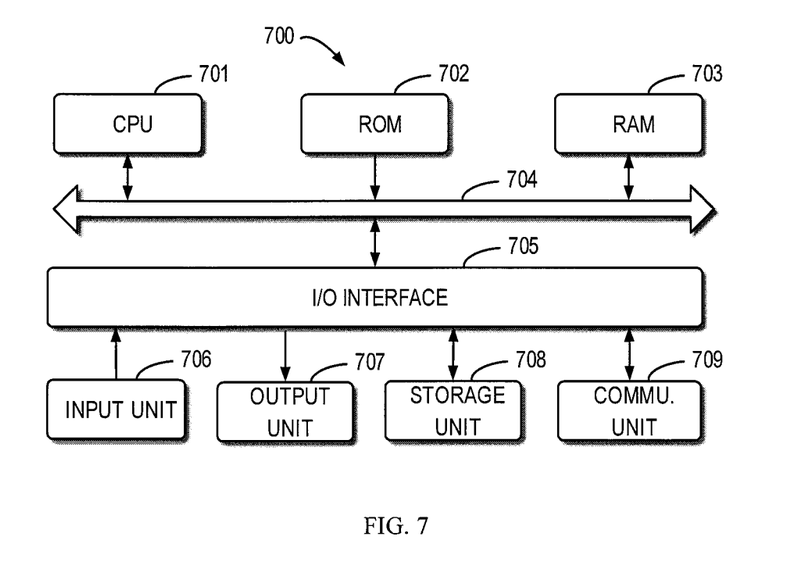
FIG. 7 illustrates a block diagram of an example device that may be used to implement the embodiments of the present disclosure.

FIG. 7 illustrates a block diagram of an example device 700 that can be used to implement the embodiments of the present disclosure. As shown, the device 700 includes a central process unit (CPU) 701, which can execute various suitable actions and processing based on the computer program instructions stored in the read-only memory (ROM) 702 or computer program instructions loaded in the random-access memory (RAM) 703 from a storage unit 708. The RAM 703 can also store all kinds of programs and data required by the operations of the device 700. CPU 701, ROM 702 and RAM 703 are connected to each other via a bus 704. The input/output (I/O) interface 705 is also connected to the bus 704.

A plurality of components in the device 700 is connected to the I/O interface 705, including: an input unit 706, such as keyboard, mouse and the like; an output unit 707, e.g., various kinds of display and loudspeakers etc.; a storage unit 708, such as magnetic disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The above described each procedure and processing, such as methods 400-600, can also be executed by the processing unit 701. For example, in some embodiments, the methods 400-600 can be implemented as a computer software program tangibly included in the machine-readable medium, e.g., storage unit 708. In some embodiments, the computer program can be partially or fully loaded and/or mounted to the device 700 via ROM 702 and/or communication unit 709. When the computer program is loaded to RAM 703 and executed by the CPU 701, one or more steps of the above described methods 400-600 can be implemented. Alternatively, in other embodiments, CPU 701 also can be configured in other suitable manners to realize the above procedure/method.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

We claim:

1. A method of managing a redundant array of independent disks (RAID), comprising:
   receiving an instruction to expand the RAID, the RAID being formed by a first group of storage devices and comprising a first group of RAID extents;
   creating, by a control path in response to receipt of the instruction to expand the RAID, a second group of RAID extents on a second group of storage devices and logical units on the second group of RAID extents;
   in response to receiving, from the RAID by the control path, an indication for a failure of the creation of the second group of RAID extents or the logical units, generating, by the control path, a notification for indicating a failure of the expansion of the RAID without the control path triggering a shuffling operation, the shuffling operation causing storage extents in the first and second groups of RAID extents to be evenly distributed in the first and second groups of storage devices; and
   wherein the indication for the failure of the creation of the second group of RAID extents or the logical units on the second group of RAID extents comprises an indication of a timeout occurring when the RAID does not become ready within a predetermined time period after creation of the second group of RAID extents.

2. The method of claim 1, further comprising:
   receiving a rollback instruction; and
   in response to receiving the rollback instruction, deleting logic units and RAID extents that have been created on the second group of storage devices.

3. The method of claim 2, further comprising:
   in response to receiving a notification that the logic units and the RAID extents that have been created are deleted, sending a notification for indicating completion of the rollback.

4. The method of claim 1, further comprising:
   in response to receiving an indication that the second group of RAID extents and the logical units are successfully created, triggering the shuffling operation.

5. A device for managing a redundant array of independent disks (RAID), comprising:
   a processing unit;
   a memory coupled to the processing unit and comprising instructions stored thereon, the instructions, when executed by the processing unit, causing the device to perform acts comprising:
   receiving an instruction to expand the RAID, the RAID being formed by a first group of storage devices and comprising a first group of RAID extents;

creating, by a control path in response to receipt of the instruction to expand the RAID, a second group of RAID extents on a second group of storage devices and logical units on the second group of RAID extents;

in response to receiving, from the RAID by the control path, an indication for a failure of the creation of the second group of RAID extents or the logical units, generating, by the control path, a notification for indicating a failure of the expansion of the RAID without the control path triggering a shuffling operation, the shuffling operation causing storage extents in the first and second groups of RAID extents to be evenly distributed in the first and second groups of storage devices; and wherein the indication for the failure of the creation of the second group of RAID extents or the logical units on the second group of RAID extents comprises an indication of a timeout occurring when the RAID does not become ready within a predetermined time period after creation of the second group of RAID extents.

6. The device of claim 5, wherein the acts further comprise:

receiving a rollback instruction; and in response to receiving the rollback instruction, deleting logic units and RAID extents that have been created on the second group of storage devices.

7. The device of claim 6, wherein the acts further comprise:

in response to receiving a notification that the logic units and the RAID extents that have been created are deleted, sending a notification for indicating completion of the rollback.

8. The device of claim 5, wherein the acts further comprise:

in response to receiving an indication that the second group of RAID extents and the logical units are successfully created, triggering the shuffling operation.

9. A computer program product having a non-transitory computer readable medium which stores a set of instructions to managing a redundant array of independent disks (RAID); the set of instructions, when carried out by computerized circuitry, causing the computerized circuitry to perform a method of:

receiving an instruction to expand the RAID, the RAID being formed by a first group of storage devices and comprising a first group of RAID extents;

creating, by a control path in response to receipt of the instruction to expand the RAID, a second group of RAID extents on a second group of storage devices and logical units on the second group of RAID extents;

in response to receiving, from the RAID by the control path, an indication for a failure of the creation of the second group of RAID extents or the logical units, generating, by the control path, a notification for indicating a failure of the expansion of the RAID without the control path triggering a shuffling operation, the shuffling operation causing storage extents in the first and second groups of RAID extents to be evenly distributed in the first and second groups of storage devices; and wherein the indication for the failure of the creation of the second group of RAID extents or the logical units on the second group of RAID extents comprises an indication of a timeout occurring when the RAID does not become ready within a predetermined time period after creation of the second group of RAID extents.

10. The method of claim 1, wherein the control path delays performing the shuffling operation until it receives at least one response from the RAID indicating that the second group of RAID extents and logical units on the second group of RAID extents have been created successfully.

* * * * *